April 30, 1968  J. K. JACQUES ET AL  3,381,113
HEAT STORAGE APPARATUS

Filed Sept. 29, 1964

JAMES KEITH JACQUES AND
EDWARD JAMES LOWE
By Herbert O. Gordon
ATTORNEY

JAMES KEITH JACQUES AND
EDWARD JAMES LOWE
By Herbert H. Goodman
ATTORNEY

United States Patent Office 3,381,113
Patented Apr. 30, 1968

3,381,113
HEAT STORAGE APPARATUS
James Keith Jacques, Birmingham, and Edward James Lowe, Stourton, near Stourbridge, England, assignors to Albright & Wilson (Mfg.) Limited, Oldbury, near Birmingham, England, a British company
Filed Sept. 29, 1964, Ser. No. 402,059
11 Claims. (Cl. 219—378)

ABSTRACT OF THE DISCLOSURE

A heat storage apparatus containing a heat source, a heat reservoir in heat transfer relationship to the heat source and means for extracting the stored heat from the reservoir in a usable form. The heat reservoir comprises a mass containing a substantial amount of ferrophosphorus in such quantity that the thermal efficiency of the heat reservoir is improved. The mass may consist essentially of ferrophosphorus in granulated or cast block form. Alternatively, the mass may comprise ferrophosphorus mixed with at least 40% of fireclay.

---

This invention relates to thermal reservoirs and is of particular value in connection with electric storage heaters, regenerative heat exchangers and the like.

It is often desirable to be able to store heat in a suitable thermal reservoir, for example, where uniform efficient heating is desired from a variable heat source. It is especially desirable to be able to utilise the electricity supplied at cheap prices during "off-peak" periods, by converting it during such periods into heat, which may be stored and used subsequently. Such storage heaters not only give marked reductions in the cost of both domestic and industrial heating, but reduce the risk that power lines will become overloaded during periods of unusually heavy demand. Thermal reservoirs are also of importance for use as heat exchangers, being alternately contacted with hot and cool fluids, thereby transferring heat from the former to the latter.

Hitherto various kinds of thermal reservoir have been proposed, none entirely satisfactory. For example reservoirs constructed of materials such as firebrick, iron and chrome magnesite have been suggested. However, in view of the relatively low efficiency of such reservoirs it has been proposed to improve the efficiency of thermal reservoirs by including therein a material that undergoes a change of phase at a particular temperature. Such reservoirs have the disadvantages that they can only be used with maximum efficiency for heat storage at particular temperatures, and that with most of these materials it has proved difficult or impossible to construct the kind of refractory self-supporting core which is required for many purposes. Moreover some of the materials proposed, e.g. sodium hydroxide, are highly corrosive, and represent a danger in the home.

We have now discovered that thermal reservoirs of greatly improved efficiency may be obtained if ferrophosphorus is employed in their construction. Our intention thus provides a thermal reservoir which comprises a mass consisting essentially of ferrophosphorus provided with a means for supplying heat thereto.

In one form of apparatus according to our invention, suitable for use as an electrical storage heater, the means for supplying heat to the mass of ferrophosphorus is an electrical heating element. Another form of apparatus, preferred for use as a regenerative heat exchanger, comprises a mass consisting essentially of ferrophosphorus and provided with a means for the passage therethrough of fluids. A form of apparatus, preferred for the heating of fluids, comprises: a mass consisting essentially of ferrophosphorus and provided with (a) a means of access to the interior thereof for a fluid, and (b) an electrical resistor adapted for the passage of an electric current therethrough, and electrically but not thermally insulated from the said ferrophosphorus mass. In this specification ferrophosphorus means the material, consisting substantially of iron and phosphorus in chemical combination, which is obtained as a by-product of the electric reduction process for manufacturing phosphorus.

Thermal reservoirs according to our invention show improved efficiency over a wide range of temperatures and may be adapted to a wide range of applications. Our invention may be partly explained by our discovery that ferrophosphorus has an unexpectedly high heat capacity as well as an unusually high thermal conductivity for a relatively refractory material. This enables large quantities of heat to be transferred rapidly into and stored in the ferrophosphorus mass. For example, we have discovered that the heat capacity per unit volume of ferrophosphorus is 1.27 calories per cc. per ° C. The corresponding figure for chrome magnesite is 0.784 calorie per cc. per ° C., for iron 0.92 calorie per ° C. and firebrick 0.528. It should be noted in this connection that if any of these materials is used in a state of sub-division the heat capacity per unit volume will vary according to the state of aggregation.

An additional advantage of ferrophosphorus over many of the materials hitherto used for heat storage is that it may readily be cast into blocks suitable for constructing strong refractory self-supporting cores. Such cores may be provided with channels for the passage therethrough of fluids or for the insertion therein of electrical heating elements. Such cast blocks of ferrophosphorus have been found to possess a crushing strength of 3,000 pounds per square inch. Blocks of even greater strength may be produced by sintering granular ferrophosphorus at moderate temperatures and under pressure, preferably in the presence of a fomaldehyde copolymer (for example phenol formaldehyde or urea formaldehyde resins), or by mixing ferrophosphorus with fireclay, and firing the resulting mass at a temperature not greater than 1,200° C.

Alternatively, a container may be loose packed with granular ferrophosphorus. In the latter case ferrophosphorus is preferably sorted into 3 grain sizes and packed layerwise commencing with the largest grains. During the addition of the smaller grain sizes the container should be gently vibrated. By this means maximum density of packing may be achieved.

A further advantage of ferrophosphorus is that it is non-corrosive. This is of particular importance where sheathed heater elements are in contact with the ferrophosphorus. Ferrophosphorus has been found to exert a specific anticorrosion effect.

The invention is further described in connection with the drawings in which

Figure 1:
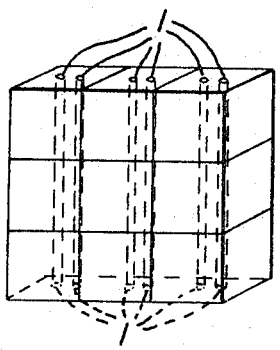
FIGURE 1 is a perspective drawing of an embodiment of a thermal reservoir constructed from cast ferrophosphorus blocks.
Figure 2:
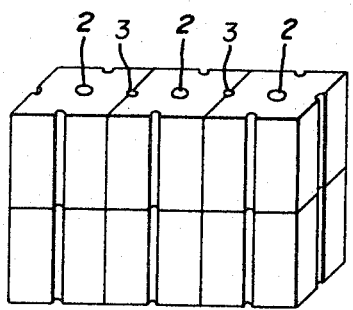
FIGURE 2 is a perspective drawing of another thermal reservoir constructed from cast ferrophosphorus blocks.
Figure 3:
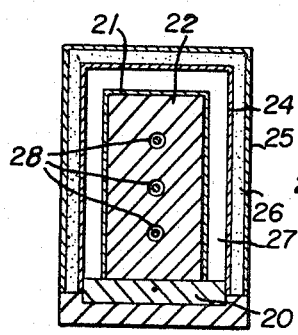
FIGURE 3 is an end elevation of the electric storage heater containing granulated or powdered ferrophosphorus depicted in side elevation in FIGURE 4.
Figure 4:
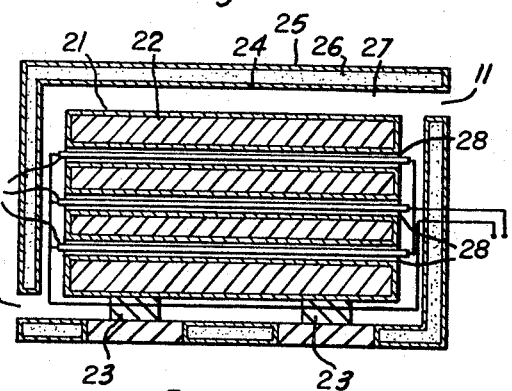
FIGURE 4 is the side elevation of the storage heater referred to in FIGURE 3.

The accompanying drawings illustrate various kinds of apparatus utilizing our invention. FIGURES 1 and 2 are perspective drawings illustrating the manner in which thermal reservoirs may be constructed from two kinds of cast ferrophosphorus block. In FIGURE 1 heating elements may be inserted through the holes 1. In FIGURE 2 heating elements are inserted in the holes 3; the larger holes 2 are ducts through which air may be passed, for example by the action of a fan, when the reservoir is to be part of a space heater. FIGURES 3 and 4 are respectively end and side elevations of an electric storage heater incorporating granulated or powdered ferrophosphorus. This comprises a mild steel case 21 containing granulated ferrophosphorus 22 supported by firebrick supports 23 and enclosed in two concentrically placed mild steel cases 24 and 25 which are separated by a layer 26 of finely divided silica or calcium aluminium silicate. Cases 21 and 24 are separated by an air space 27. The case 21 is traversed by steel tubes 28 supporting heater elements 29. The air vents 10 and 11 may be connected to an air circulation system. The ferrophosphorus 22 may for example comprise 64% by weight of material stopped by 5 mesh, 25% material stopped by 25 mesh and 11% by weight which passes 200 mesh.

Figure 5:
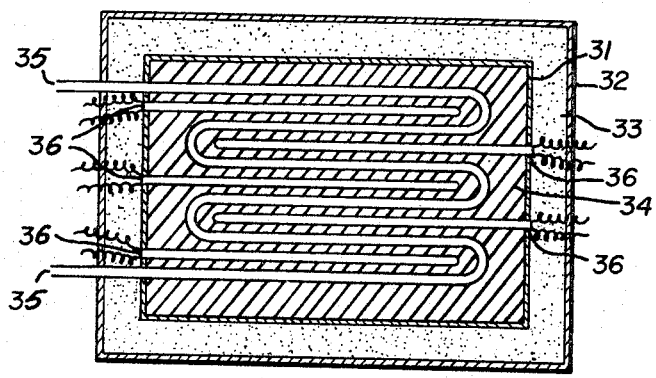
FIGURE 5 is a side elevation of a thermal reservoir adapted to heat a water circulation system.

FIGURE 5 is a side elevation of a thermal reservoir according to our invention adapted to heat a water circulation system. It comprises concentric steel cases 31 and 32. The space 33 between 31 and 32 is filled by a suitable insulation material, preferably a reverse characteristic insulant. The space 34 inside the case 31 is filled with granulated ferrophosphorus. Water circulates within the case 31 through a copper pipe 35, and is heated by the sheathed electric heating elements 36.

Figure 6:
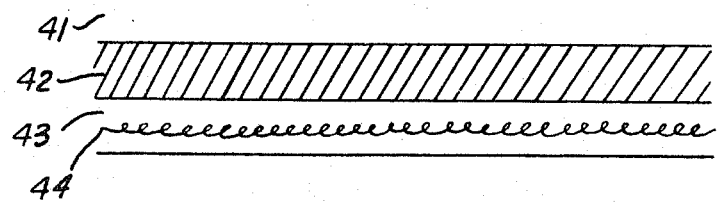
FIGURE 6 is a schematic cross-section of an underfloor electric heating system.

FIGURE 6 illustrates an underfloor heating system according to our invention which comprises a layer of floor material 41 which may, for example, be concrete or asphalt. Layer 42 which may comprise granulated ferrophosphorus or cast tiles of ferrophosphorus, and a structural concrete floor 43 having embedded therein an electrical heating element 44.

Figure 7:
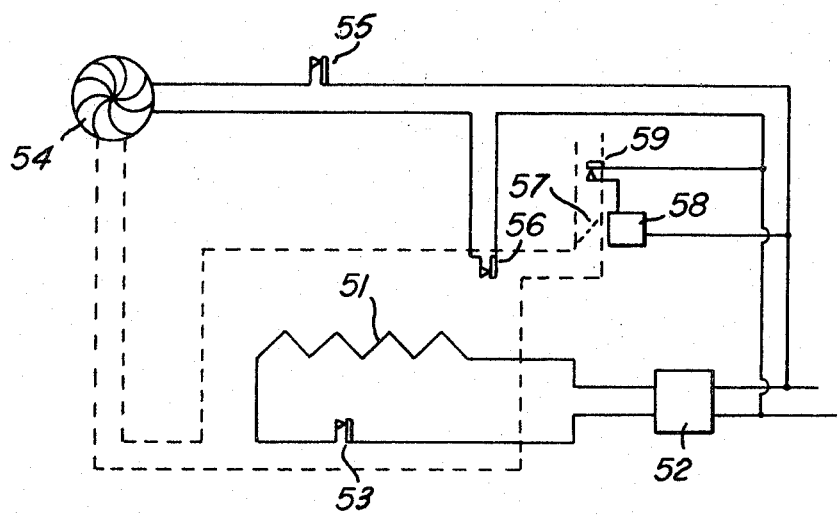
FIGURE 7 is a wiring diagram of a typical electric circuit suitable for use with a domestic storage heater of the type illustrated in FIGURES 3 and 4.

FIGURE 7 is a diagram illustrating a typical electric circuit suitable for use with a domestic storage heater, of the type illustrated in FIGURES 3 and 4. The current supplied to the heater 51 is regulated by a time switch 52, and a thermal relay 53 which is embedded in the ferrophosphorus mass. Air is passed through the heater by a fan 54, the current supply to which is controlled by two thermal relays 55 and 56, one of which is situated in the room to be heated, and a second, adapted to break the circuit when at a higher temperature, in the air stream leaving the heater. The supply of heated air to the room may be further regulated by a damper 57 which is controlled by a solenoid 58, the current supply for which passes through a thermal relay 59, situated in the airstream beyond the damper 57.

The thermal reservoirs of our invention may also be used in connection with liquid or gaseous fuel burners, and with industrial heat exchangers.

For example, two sets of pipes may be embedded in a mass of cast or granulated ferrophosphorus, one intermittently carrying a hot fluid, and the other carrying a cooler fluid. Alternatively, the two fluids may be passed alternately through a single set of pipes. For this purpose the fluids may be either liquids or gases.

A mass of ferrophosphorus may be provided with a set of pipes, for the passage therethrough of the fluid to be heated and ducts through which may be passed hot gases from a furnace or the flame of a gaseous or liquid fuel burner. In a further modification, hot and cool gases may be passed alternately through a bed of granulated ferrophosphorus. Numerous other embodiments of our invention will be apparent to those skilled in the art.

It has been found that the electrical conductivity of ferrophosphorus is such that sheathed heating elements are advisable for use in electric storage heaters according to our invention, however, where the thermal reservoir is constructed of powdered ferrophosphorus mixed with at least 40% of fireclay and fired to give blocks or tiles, unsheathed nickel/chrome alloy wire heating elements may safely be used. In all cases the tendency of the ferrophosphorus to prevent corrosion is a marked advantage.

What we claim is:

1. In a heat storage apparatus comprising a heat source, a heat reservoir in heat transfer relationship to said heat source, and a means for extracting heat from said heat reservoir in a readily utilizable form, the improvement which consists in utilizing as said heat reservoir, a mass containing a substantial amount of ferrophosphorus in such quantity as to greatly improve the thermal efficiency of the heat reservoir in an amount sufficient to function as an effective heat reservoir.

2. In a heat storage apparatus comprising a heat source, a heat reservoir in heat transfer relationship to said heat source, and a means for extracting heat from said heat reservoir in a readily utilizable form, the improvement which consists in utilizing as said heat reservoir, a mass consisting essentially of ferrophosphorus.

3. The apparatus of claim 2 wherein said heat source is at least one electric heating element in thermal contact with said heat reservoir.

4. The apparatus of claim 3 wherein the electrical heating elements are sheathed elements embedded in said ferrophosphorus-containing mass.

5. The apparatus of claim 4 wherein said ferrophosphorus-containing mass is a mass of granulated ferrophosphorus.

6. The apparatus of claim 2 wherein said heat reservoir comprises cast blocks manufactured by sintering granulated ferrophosphorus at a temperature between 700 and 1200° C., in the presence of a formaldehyde copolymer.

7. The apparatus of claim 2 wherein said means for extracting heat from said heat reservoir is at least one passage for a fluid, said passage being in said heat reservoir.

8. The apparatus of claim 7 containing an electric heater as said heat source, said electric heater being electrically insulated from said heat reservoir and in thermal contact with said heat reservoir.

9. The apparatus of claim 7 wherein said mass of ferrosphorus is enclosed in a thermally insulating envelope.

10. In the heat storage process wherein heat from a heat source is stored in a heat reservoir, and heat is extracted from said heat reservoir in a useable form, the improvement which consists of utilizing as said heat reservoir, a mass containing a substantial amount of ferrophosphorus in such quantity as to greatly improve the thermal efficiency of the heat reservoir.

11. In a heat storage apparatus comprising a heat source, a heat reservoir in heat transfer relationship to said heat source, and a means for extracting heat from said heat reservoir in a readily utilizable form, the improvement which consists in utilizing as said heat reservoir, a reservoir consisting essentially of a mixture of ferrophosphorus and fire clay, said fire clay being at least 40% by weight of the total of said ferrophosphorus and fire clay, said mixture containing a substantial amount of ferrophosphorus in such quantity as to greatly improve the thermal efficiency of the heat reservoir.

References Cited

UNITED STATES PATENTS

| | | | |
|---|---|---|---|
| 282,118 | 7/1883 | Reese | 75—132 |
| 1,069,378 | 8/1913 | Bell et al. | 219—302 |
| 1,338,750 | 5/1920 | Schranck et al. | 126—400 X |
| 2,476,418 | 7/1949 | Klugh | 75—132 |
| 2,556,281 | 6/1951 | Kotik | 219—378 X |

FOREIGN PATENTS 545,021  5/1942  Great Britain.

ANTHONY BARTIS, *Primary Examiner.*

UNITED STATES PATENT OFFICE
CERTIFICATE OF CORRECTION

Patent No. 3,381,113　　　　　　　　　　　　April 30, 1968

James Keith Jacques et al.

It is certified that error appears in the above identified patent and that said Letters Patent are hereby corrected as shown below:

Column 4, lines 29 and 30, cancel "in an amount sufficent to function as an effective heat reservoir".

Signed and sealed this 9th day of September 1969.

(SEAL)
Attest:

Edward M. Fletcher, Jr.
Attesting Officer

WILLIAM E. SCHUYLER, JR.
Commissioner of Patents